US008688861B2

(12) United States Patent
Berg et al.

(10) Patent No.: US 8,688,861 B2
(45) Date of Patent: *Apr. 1, 2014

(54) SCALABLE SYNCHRONIZATION OF EVENTS AMONG SERVER AND CLIENTS WITH VARYING LAG-TIMES

(71) Applicants: Johannes Berg, Vasa (FI); Marcus Wikars, Vasa (FI); Magnus Holtlund, Vasa (FI)

(72) Inventors: Johannes Berg, Vasa (FI); Marcus Wikars, Vasa (FI); Magnus Holtlund, Vasa (FI)

(73) Assignee: Lumi Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,824

(22) Filed: Oct. 9, 2012

(65) Prior Publication Data

US 2013/0031273 A1   Jan. 31, 2013

Related U.S. Application Data

(63) Continuation of application No. 13/269,211, filed on Oct. 7, 2011, now Pat. No. 8,312,173.

(60) Provisional application No. 61/391,272, filed on Oct. 8, 2010.

(51) Int. Cl.
*G06F 15/16* (2006.01)

(52) U.S. Cl.
USPC ............................ 709/248; 709/203; 709/223

(58) Field of Classification Search
None
See application file for complete search history.

(56) References Cited

U.S. PATENT DOCUMENTS

| 6,191,821 | B1 | 2/2001 | Kupnicki |
| 6,684,383 | B1 | 1/2004 | Natori et al. |
| 6,745,011 | B1 | 6/2004 | Hendrickson et al. |
| 6,754,470 | B2 | 6/2004 | Hendrickson et al. |
| 7,408,502 | B2 | 8/2008 | Percy et al. |
| 7,516,204 | B2 | 4/2009 | Kobayashi et al. |
| 7,523,191 | B1 | 4/2009 | Thomas et al. |

(Continued)

FOREIGN PATENT DOCUMENTS

| WO | 03021463 | 3/2003 |
| WO | 2006099586 | 9/2006 |

(Continued)

OTHER PUBLICATIONS

Compton, Georgina, "Search and Advisory Service Search Report—Sponsor Ref.: 45011; SAS Ref.: S1226401; Applicant: Apollo Mobile Ltd.", Jan. 20, 2011, 6 pages, Search and Advisory Service Intellectual Property Office, Newport, South Wales.

(Continued)

*Primary Examiner* — Mohamed Ibrahim
(74) *Attorney, Agent, or Firm* — Brown Rudnick LLP

(57) ABSTRACT

The invention relates generally to synchronizing functions on handheld devices and more particularly to precisely synchronizing a function among a large number of devices having multiple different platforms. The invention provides the ability to cause a large number of handheld devices to perform certain functions simultaneously, within seconds or fractions of a second of each other. In certain aspects, the invention provides an apparatus for synchronizing a function among devices, including one or more processors in communication with a memory and configured to, for each of the devices, send an event to the device, receive a timepacket, and send a return timepacket, thereby causing the device to receive the event and invoke the function after a delay.

20 Claims, 6 Drawing Sheets

(56) References Cited

U.S. PATENT DOCUMENTS

| | | | |
|---|---|---|---|
| 7,817,983 | B2 | 10/2010 | Cassett et al. |
| 7,873,353 | B2 | 1/2011 | Kloba et al. |
| 7,877,518 | B2 | 1/2011 | Liu |
| 7,907,966 | B1 | 3/2011 | Mammen |
| 2005/0075068 | A1 | 4/2005 | Goring et al. |
| 2005/0239551 | A1 | 10/2005 | Griswold et al. |
| 2005/0243784 | A1 | 11/2005 | Fitzgerald et al. |
| 2005/0273804 | A1* | 12/2005 | Preisman ................ 725/24 |
| 2006/0080683 | A1 | 4/2006 | Anwar et al. |
| 2006/0142005 | A1 | 6/2006 | Takaluoma et al. |
| 2007/0220494 | A1 | 9/2007 | Spooner |
| 2007/0260475 | A1 | 11/2007 | Bhanote |
| 2007/0288662 | A1 | 12/2007 | Chen |
| 2008/0016176 | A1 | 1/2008 | Leitner |
| 2008/0059300 | A1 | 3/2008 | Hamoui |
| 2008/0098062 | A1 | 4/2008 | Balia |
| 2008/0195691 | A1 | 8/2008 | Kloba et al. |
| 2008/0201453 | A1 | 8/2008 | Assenmacher |
| 2008/0215672 | A1 | 9/2008 | Kloba et al. |
| 2009/0005002 | A1 | 1/2009 | Agarwal |
| 2009/0119375 | A1 | 5/2009 | Shenfield |
| 2009/0150872 | A1 | 6/2009 | Russell et al. |
| 2009/0157792 | A1 | 6/2009 | Fiatal |
| 2009/0167553 | A1 | 7/2009 | Hong et al. |
| 2009/0203352 | A1 | 8/2009 | Fordon et al. |
| 2009/0228862 | A1 | 9/2009 | Bertelrud et al. |
| 2009/0254851 | A1 | 10/2009 | Scott et al. |
| 2009/0271267 | A1 | 10/2009 | Moukas et al. |
| 2009/0282127 | A1 | 11/2009 | Leblanc et al. |
| 2009/0300143 | A1 | 12/2009 | Musa et al. |
| 2010/0100445 | A1 | 4/2010 | Flood et al. |
| 2010/0100917 | A1* | 4/2010 | Chiao et al. ................ 725/110 |
| 2010/0115047 | A1 | 5/2010 | Briscoe et al. |
| 2010/0121744 | A1 | 5/2010 | Belz et al. |
| 2010/0146133 | A1 | 6/2010 | Perrin et al. |
| 2010/0281475 | A1 | 11/2010 | Jain et al. |
| 2010/0284380 | A1 | 11/2010 | Banerjee et al. |
| 2011/0016172 | A1* | 1/2011 | Shah ................ 709/203 |
| 2011/0072371 | A1 | 3/2011 | Segal et al. |
| 2011/0154305 | A1 | 6/2011 | LeRoux et al. |
| 2011/0161912 | A1 | 6/2011 | Eteminan et al. |
| 2011/0202687 | A1* | 8/2011 | Glitsch et al. ................ 709/248 |
| 2012/0173986 | A1 | 7/2012 | Jung |
| 2012/0296680 | A1* | 11/2012 | Jantz et al. ................ 705/5 |
| 2012/0303399 | A1 | 11/2012 | Rabstejnek |

FOREIGN PATENT DOCUMENTS

| | | |
|---|---|---|
| WO | 2008042923 | 4/2008 |
| WO | 2008091101 A1 | 7/2008 |
| WO | 2009079794 | 7/2009 |

OTHER PUBLICATIONS

International Search Report and Written Opinion for PCT/US2011/055433, Jun. 1, 2012 (8 pages).

International Search Report and Written Opinion in International Patent Application PCT/US2011/055426, mailed Mar. 22, 2012 (8 pages).

International Search Report and Written Opinion for PCT/US2011/055440, May 31, 2012 (9 pages).

* cited by examiner

SCALABLE SYNCHRONIZATION OF EVENTS AMONG SERVER AND CLIENTS WITH VARYING LAG-TIMES

RELATED APPLICATION

This application is a continuation of U.S. Nonprovisional Application Ser. No. 13/269,211, which claims priority to U.S. Provisional Application Ser. No. 61/391,272, filed Oct. 8, 2010, the contents of each of which are incorporated by reference herein in their entirety.

FIELD OF THE INVENTION

The invention relates generally to synchronizing functions on handheld devices and more particularly to precisely synchronizing a function among a large number of devices having multiple different platforms.

BACKGROUND

Portable handheld devices such as smartphones and tablet computing devices are widely distributed around the globe. In some markets, nearly every potential consumer carries their own device and uses it to send and transmit information. Devices are configured to use phone networks, like 3G and 4G networks, as well as data networks such as Internet connections accessed through WiFi. Accordingly, these devices can offer their users the ability to send and receive data almost constantly while they are turned on.

This widespread connectivity is used for communication such as email or SMS text messages, advertising such as displaying banner ads in web browsers, and targeted marketing such as real-world posters which encourage a person to send a text message to a particular number to receive more information. However, when a number of devices are meant to receive a single communication, they will typically get it at differing times. This can be, for instance, because the individual devices are serviced by different providers or different types of connections, causing the devices to receive text messages or emails—even if sent simultaneously—at different times.

For example, one person may have a smartphone connected over a 3G cell network, while another person may have the same model of smartphone but may be connected through a WiFi hotspot with a greatly different data connection speed. Or, a person may have an iPhone or a different model of phone serviced by a different provider. Even if each device and connection is outwardly similar, behind-the-scenes network latency can prevent synchronous function. Ironically, the more alike two devices are in terms of model, location, or provider, the more likely it is that they are being serviced by the same hardware, such as the same sector of the same cell tower, with the result that the system must send and receive data to them in turn, rather than simultaneously.

Lacking the ability to operate in synchronicity, devices lack the ability to be beneficially used in communication or marketing efforts that require synchronization of function among devices. For example, a producer of a TV quiz show may want to provide viewers with a quiz show app that presents each viewer with a question simultaneously with its being asked in the show. If the producer transmitted the question as an email or an SMS text message, one viewer may receive it and answer it before another viewer receives it at all. Attempting to link a display time to a device system time does not help, because device system times can be arbitrarily or purposefully set incorrectly.

SUMMARY

The invention provides the ability to cause a large number of electronic devices to perform certain functions simultaneously, within seconds or fractions of a second of each other. For example, each device can display a question. In certain embodiments, this is a valuable way to administer a quiz. If, for example, the quiz is in conjunction with a contest in which prizes are awarded for a first correct answer, systems of the invention provide a fair playing field on which people can participate. Each person, for example, can use their own smartphone or other device, and see a question. All people are shown the question simultaneously, and simultaneously given the opportunity to answer it via their own device.

In some embodiments, the devices all perform the functions in relationship to a real-world event. For example, during a show, live or on television, members of the audience can be given a fun quiz question relating to some content as it happens during the show. As an illustrative example, during a broadcast of a TV show about cops and robbers, each device could simultaneously exhibit the question, "What kind of car was the detective driving? The first ten correct answers win a free mp3 player."

In certain embodiments, the function is exhibited by devices of disparate types, with different operating systems, and substantially simultaneously. In view of the fact that different devices may have their own internal time-keeping, and that the different devices are likely not synchronized to each other, systems and methods of the invention provide the ability to synchronize when each device will perform the function.

In certain embodiments, the ability to synchronize when devices will perform a function is provided by a server computer system. The server computer system will generally include one or more different computer devices (such as desktop computers, rack-mounted servers, or other), thereby including one or more processors. The processors will generally be coupled to at least one memory device and configured to communicate with handheld devices.

The server uses a construct of the invention known as an event to synchronize the devices. An event generally is a data structure of the invention, and can include a variety of constructs. For the purposes of synchronization, an event includes a reference to the function, as well as a time at which the function is to be exhibited by the devices, also known as the desired event time (DET).

In certain embodiments, the server sends the event to each device, thereby giving the device a reference to what function will be performed and an indication of the time at which it is desired for the function to be formed.

To synchronize the devices, the server will then generally receive a timepacket from each device and send a return timepacket to the device. This allows each device to calculate a round-trip time by which information travels between the device and the server. Then, by referencing the time at which it received the event, and the desired event time, and round-trip time, each device can determine when to perform the function. By providing each device with the means to determine when to perform the function, the invention supplies the ability to synchronize functions across a large number of devices.

In certain embodiments, systems of the invention can collect the information or answers supplied by people and aggregate, report, or analyze the information.

In certain aspects, the invention provides a system for synchronizing handhelds. In certain embodiments, the system includes a server, which can send content to each of a number of handheld devices. The content includes some functionality, such as quiz questions or a survey.

In the system, each of the handheld devices is capable of communicating with the server to obtain the content and store it.

The server also sends the event to each handheld. Each handheld receives the event at an event receipt time $t_4$. In order to synchronize the exhibition of the functionality, each device will send a timepacket at a start time $t_1$ to the server. The timepacket is a file including the start time $t_1$ itself In response, the server will send a return timepacket at a return time $t_2$ to each handheld, and this return timepacket will also include the return time. The handheld receives the return timepacket at time $t_3$. This allows each handheld to determine a roundtrip time ($RTT=t_3-t_1$) and calculate a server difference ($SD=t_2+(RTT/2)-t_3$). Each handheld can then calculate a delay ($D=DET-(t_4+SD)$). With this information, each handheld can then exhibit the functionality at a synchronized desired event time ($SDET=t_4+D$). In certain embodiments, SD is calculated a number of times, repeatedly, and continuously. The results can be averaged, or a weighted average can be calculated. With reference to the averaged result, it does not matter how long RTT is when the actual event is sent. By aggregating these calculations into a best possible average, the device can perform a function in synchronicity with a server time, without regard to what the RTT actually is.

The functionality can include anything a handheld device is capable of Different handheld devices, such as Blackberries, iPhones, and Java-based smartphones, have different hardware capabilities, such as touchscreens versus keyboards. However, all such devices generally have in common the ability to display information, receive input, play and record sounds, as well as other common smart phone functions. Accordingly, the functionality can involve any of these capabilities. In certain embodiments, the functionality takes the form of a quiz or a survey. Generally, a quiz or a survey includes at least one instance of displaying a question to a person and taking input from that person. By planning the synchronization in view of, or in conjunction with, a real-world event, the devices can be caused to display a question or receive input simultaneously with the real-world event.

The invention provides the ability to create or invoke events in real-time. For example, the server can send the event to the handhelds within approximately 45 seconds in advance of the desired event time. This would allow, for instance as a real-world live event unfolds, one to create functions based on real-world happenings and send them to devices as the real-world event unfolds.

The invention further provides substantially simultaneous synchronization of functions. In certain embodiments, the devices exhibit the function within approximately one second of each other.

In certain aspects, the invention provides an apparatus for synchronizing a function on a plurality of devices. The apparatus can be a server computer system or a server and can include a processor which can optionally be a plurality of processors. The apparatus can include an event stored in a memory.

In certain embodiments, the processor—or plurality of processors—is configured to communication with each of the plurality of devices.

For each device, the processors can send the event to the device, receive a timepacket from the device, and send a return timepacket to the device, thereby causing the device to receive the event and invoke the function after a delay.

The apparatus can further include content. The content can include the function. For example, the content can be a file or a section including a quiz question or an input prompt or another function according to the invention. The one or more processors can then send the content to each device.

In certain embodiments, the event further comprises a desired event time (DET) and, for each device, each timepacket comprises a start time $t_1$ indicating the time at which the timepacket was sent. Each device receives the event at an event receipt time $t_4$. Further, for each device, the one or more processors add to the timepacket a system time $t_2$ and send the return timepacket comprising the system time $t_2$ causing the device to receive the return timepacket at a receipt time $t_3$. This enables each device to determine a roundtrip time ($RTT=t_3-t_1$) and calculate a server difference ($SD=t_2+(RTT/2)-t_3$). Each device can then calculate a delay ($D=DET-(t_4+SD)$). This allows synchronization to be obtain, as each device can then exhibit the function at a synchronized event time ($SDET=t_4+D$). In certain embodiments, the devices are not all of the same type and, accordingly, do not all contain the same platforms or operating system. Thus, systems and methods of the invention provide that, for one of the plurality of devices, the start time $t_1$ comprises a Java Virtual Machine system time from a Java Virtual Machine environment and, for a second one of the plurality of devices, a second start time $t_1$ comprises an iOS system time from an iPhone platform. The invention further provides the start times can come from any two or more client platforms, including platforms that are the same or dissimilar.

In certain embodiments, the function can take the form of a quiz, or a survey, or can otherwise include a question. The function can include causing each of the plurality of devices to prompt for, or receive, input. Accordingly, systems and methods of the invention include the ability to gather a plurality of inputs.

In some embodiments, the apparatus or the system of the invention includes a core database in communication with the memory and the one or more processors. The one or more processors aggregate the plurality of inputs to create an aggregate result. This result can be stored in the core database. Items stored in the core database can be individual, in the sense that they can be specifically associated with a certain user (i.e., a log-in name, a password, or a credit card number). Items stored in the database can also be group items, which can include any items meant to be shared with a plurality of users, such as a histogram of survey results or a pollgraph. An item can also be both individual and group, for example, the name of a winner of a contest. The one or more processors can store an aggregate result as a group item in the core database and create a displayable object that can display the aggregate result. In certain embodiments, each of the devices then displays these results.

In certain aspects, the invention provides a method for causing a function to function synchronously on a plurality of devices. The method can operate by means of a computing system comprising one or more processors and includes receiving a timepacket from one of the devices and sending a return timepacket to that device. The method also involves sending an event comprising a reference to the function to the device, thereby causing the device to invoke the function after a delay. The method further includes performing these same steps on a second device, thereby causing the second device to invoke the function within approximately 1 second of when the device invokes the function. The method further includes performing these steps in a simultaneous or iterative fashion, or a combination thereof, by means of the one or more processors, for each of the remaining devices of the plurality. As a result, devices all invoke and exhibit the function substantially simultaneously. In certain embodiments, substantially simultaneously means within approximately 1 second of each other.

DETAILED DESCRIPTION

1. Overview

The invention provides a methodology for creating best-effort synchronization between absolute events on a server and multiple clients with varying lag-times, where the synchronization is also scalable to large numbers of clients.

A methodology is described for a client/server content management system that allows multiple handheld clients, experiencing varying network latency, to synchronize on a best-effort basis to absolute time events on the server, where these may in turn have been started relative to an absolute event that is external to the system (an example would be a series of quiz questions sent by the server, in turn synchronized to a TV broadcast). Furthermore, the server is able to push content to the client in real-time, thus allowing a multitude of clients to be presented with content in real-time on the handhelds at approximately the same time despite varying network conditions.

Another feature of the synchronization methodology used is that it is highly scalable to large numbers of connected users.

Also, since answers are received from the clients within a reasonable timeframe (as a result of the synchronized questions), the server is able to create meaningful statistics, poll or survey results etc. in real-time from the collective answers to particular questions. These results may e.g. in turn be pushed back to the clients, or analyzed on the server.

For the purposes of this invention, a general client/server content management system architecture for handhelds is described. One such system in particular is RE4CTOR authored by Apollo Media, however, the architecture applies generally.

A client/server content management system for handhelds exists and includes, among many others, the following abilities:

1. The ability to push content to the client in real-time. This is accomplished via a multi-phase content preparation process running on the server which optimizes which parts of the content have been changed on the server or navigated to by the client, or if an event has occurred—each of which signal a need to push that particular piece of content to the individual clients affected. The server maintains individual socket connections (or HTTP fall-back connections) to registered listeners and is aware of which clients require new content to be pushed in real-time using these connections.

2. The ability to have "events" on the server invoke new actions on the client in real-time, e.g. to show a new screen, to play a sound, to vibrate etc.

3. The ability to schedule events, recognize when these events occur on the server, and prior to that time push the events out to the clients. One example of scheduled events is the Quiz/Survey construct, where individual questions are scheduled to be sent to client handhelds relative to the start of some external event.

Figure 1:
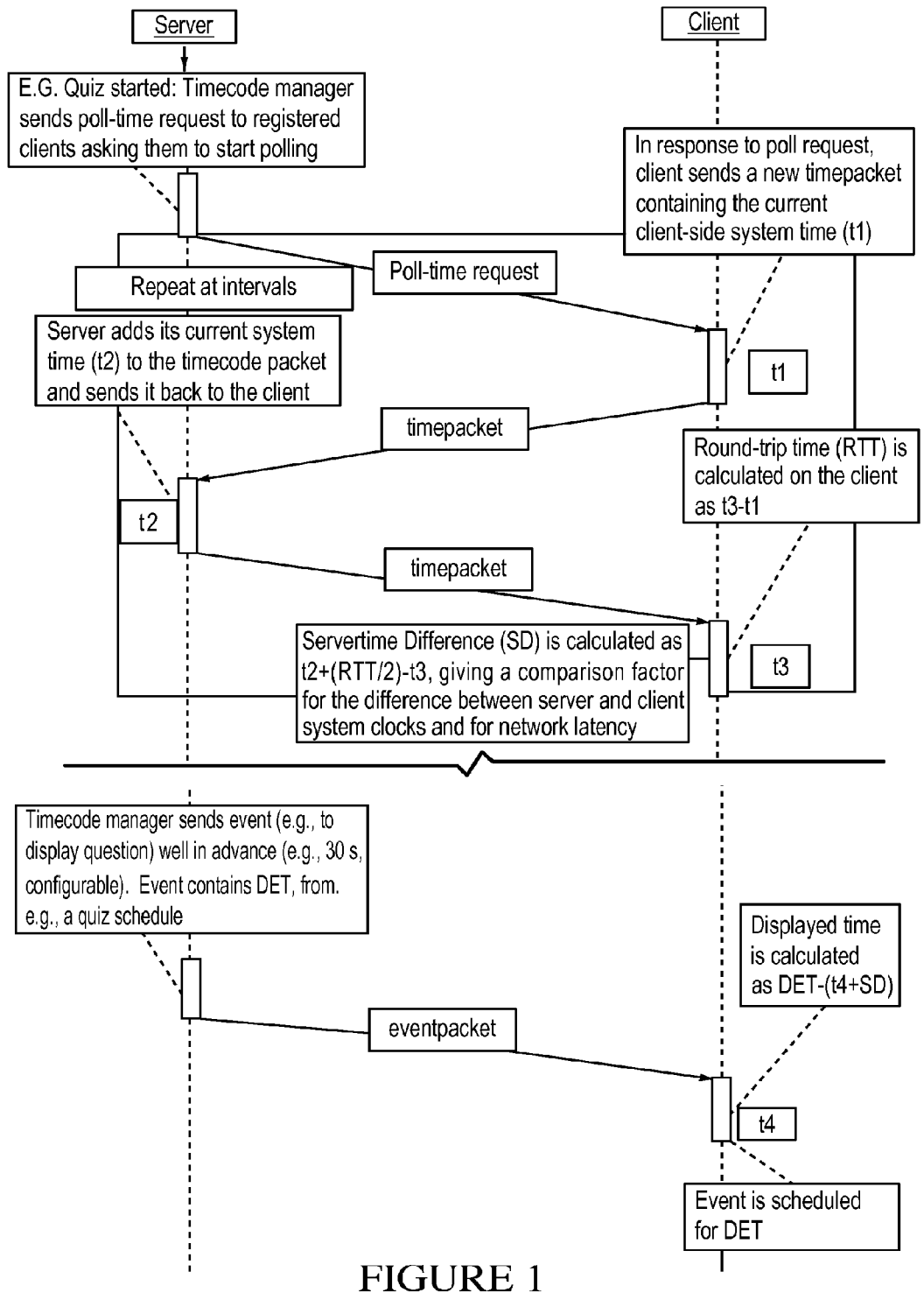
FIG. 1 illustrates a system and method of synchronization among a server and clients.

FIG. 1 is a diagram showing a method for creating server/client synchronization.

The following describes the various run-time events in FIG. 1, from top to bottom.

In short, these events form the basis whereby individual clients can maintain a frequently updated approximation of how they differ from the actual server time, in terms of the individual handheld system clocks and the individual network latencies currently being experienced.

First, a server sends poll-time requests. The server maintains long-running background services that push out to the clients on a recurring basis requests to perform time polling of the server. These requests are sent to of all registered listeners, i.e. currently connected end-user clients that are to participate in synchronization.

Next, each client sends a timepacket to the server containing its own time. In response to the regularly received poll-time request, the client will respond by sending the server a timepacket (a proprietary packet wrapping various time values) containing the client's own system time ($t_1$) at the time of creation of the timepacket. The system time comes from the client's platform, for example the underlying Java Virtual Machine (JVM, the environment under which Java programs execute) for Java client handhelds, or from the JVM equivalent for other platforms such as the iPhone. This time will likely be different on each distinct client since different handhelds, or platform therein, are not necessarily expected to be synchronized with each other or any centralized time.

Next, the server adds its own time to the timepacket. The server receives the above timepacket, and adds its own current server system time ($t_2$) to it and returns it to the client. The packet is returned immediately after the system time has been added in order to make round trip time measurements as accurate as possible.

Then the client receives the timepacket from the server. The client receives the timepacket back at its own system time $t_3$ and is now able to calculate what the network round trip time (RTT) was in terms of its own clock (i.e. $t_3-t_1$). The client also calculates what the approximate equivalent time is on the server (Servertime Difference, or SD) as: (SD=$t_2$+ (RTT/2)–$t_3$), i.e. the server's own clock time as last sent, plus half the round trip time as per the client's system clock, minus the client's system clock time when the timepacket came back. The SD thus represents a compensation mechanism encompassing both the differing system clocks and the network latency, and is updated for each individual client on a continuing basis to get the best possible measurement.

Next, a scheduled event is generated on the server. Asynchronously and independently of the process described above, the server may generate events that are meant to trigger actions on the client at particular absolute times. This could be, for example, displaying a particular question that is part of a Quiz schedule, where that Quiz has been started by a system administrator, for example, because a TV broadcast has started at a particular time.

The server sends out the event well in advance of when it is supposed to occur. This might typically be 30-45 seconds, and is configurable on the server on a per Quiz basis. The event contains the time at which it is supposed to ideally occur (call it Desired Event Time, or DET) and also contains a reference to the actual content, e.g. an actual Quiz question, which has been previously pushed to the handheld as a result of push/update of the Quiz content.

Note that events may also be generated ad-hoc by a system administrator. As with scheduled events, these are sent in advance and contain a DET expressed in server clock-time.

Quizzes, events, and surveys are discussed in more detail in their own section, infra.

Finally, the scheduled event is received in advance by the client. The client receives the event containing the DET at (its own system time) $t_4$. The client is now able to calculate the delay after which the event should occur as: $DET-(t_4+DS)$. This is the best effort approximation of the absolute time that the event is occurring on the server, which in turn may be synchronized with an external event (e.g. the start of a TV broadcast).

The event is scheduled on the client side by putting it on a queue, so that the client interface is once again responsive. When the scheduled time arrives, for example, quiz question appears on the handheld automatically in real-time (i.e. no user action is required in order to retrieve/present it).

Note that by sending the events in advance, the system is able to remain highly scalable, in that event messages for large numbers of clients are able to be serviced by the server over several seconds or even minutes prior to the actual desired time for the event. In other words, although a traffic peak may occur for a given event (e.g. 30 sec. prior to the actual event), the server is able to service this traffic peak in time for the actual event. Whereas in the absence of this architecture, the traffic peak would be occurring at or close to the actual event, possibly leaving events un-serviced.

Systems and methods of the invention provide for server-side consolidation of answers. A consequence of the synchronization described is that the multiple answers to a given question are likely to appear at the server within a reasonable time-period of the question being sent out. This enables the server to create meaningful statistics, poll or survey results or similar in real-time from the collective answers to a particular question. These results may, in certain embodiments, in turn be pushed back to the clients or analyzed on the server in real-time.

2. Content Management System

In certain aspects, the invention provides an architecture for client-server content management systems that enables a single version of content and behavior authored on the server to be distributable to and optimized for disparate client platforms. This architecture supports synchronization and the scalability of synchronization by greatly facilitating fast and efficient distribution of content, events, and timepackets between the server and client.

Content and behavior delivered to the system's end-users starts out as server-side XML authored for, or by, a content producer. This content XML consists of elements that describe: behavior (e.g. navigation between screens, how to respond to user inputs etc.), appearance (e.g. aspects of screen layout, which actual widgets exist on screens etc.) and actual data (e.g. references to actual images, user input text data, authored text data, RSS feeds etc.). These elements in concert can be said to constitute "content and behavior".

This "content and behavior" can be thought of as an app within an app. The outer app is the (one-time authored) handset executable for a given platform (e.g. the Java ME client or iPhone app), while the "content and behavior" is the inner (or content) app, as created by the producer. The inner app is made executable and real-time distributable by a combination of a multi-phased content preparation process on the server side and interaction with the (outer) client executable.

Content delivered to clients begins on the server-side as one or more content sections comprising content. In certain embodiments, the objects are XML documents. These sections, for example, as XML, are written by a content producer. The sections include elements that describe behavior, including for example navigation between screens or how to respond to user inputs; appearance, including for example aspects of screen layout or which actual widgets exist on screens; and actual data, including for example references to actual images, user input text data, authored text data, or RSS feeds. These elements in concert can be said to constitute "content and behavior".

The invention supplies a content management system that provides full and real-time interactivity on most types of mobile device. Systems of the invention enable the creation, management, storage, presentation, revision, and delivery of content with full and real-time interaction to device users. In certain embodiments, content creation is easily done using an XML-based format, and the system supports most mobile device platforms and is readily adaptable to new platforms as these may arise.

Systems of the invention comprise three parts: a web interface for content creation and management, as well as end user data analysis; a gateway server where the bulk of the code resides, and where content preparation and data storage are performed; and one or more client applications that run on end-user devices to deliver and allow interaction with content.

In certain embodiments, content is created as XML files using the web interface accessed via a standard browser. The content is uploaded as sections to the gateway server, and output as client sections in a packet format to be delivered to users through the client applications. The web interface can be a stand-alone application, for example, mounted on a Java servlet container such as Tomcat. Communication between the web interface and the gateway server can be done via dedicated TCP/IP socket connections.

In certain embodiments, the gateway server is a system built using Java 2 Standard Edition, with some Java 2 Enterprise Edition features also used. The server system is divided into several separate applications. Each application can be run on its own, or they can all be run together using a Virtual Machine. The gateway server communicates both internally and externally with TCP/IP socket connections. Data is sent internally as packets, using a simple packet format. The communication on the production side (i.e. using the web interface) is done using XML (in the form of XML packets). The server system also uses the packet format when communicating with the end user client application.

The client applications that are run on mobile devices can be Java ME MIDP applications. They can also be ported to non-Java platforms such as the iPhone and non-MIDP platforms. The client applications communicate with the gateway server via either a TCP/IP socket connection, if available, or over HTTP. The client applications can be built in many variations, depending on project-specific platforms and technologies. In certain embodiments, the client application can be built to operate in Java, iPhone, and other platforms. If new handset platforms are created in the future, systems of the invention makes it relatively straightforward to port the client application to these as well. Additionally, one of the strengths of the system is the ease with which the system can be tailored according to the needs and demands of individual projects.

The client application is tailored to the particular device it sits on. In this regard, the client application functions like an "outer app". The client application functionalizes content delivered by the system in a client form to the device.

Content creation, performed using the web interface, takes place on the production server. Content delivery is accomplished via download or streaming sections from the production server, through the gateway server, and to the client application. Background images, text, color, and layouts can all be fully-controlled by the production server as well in real-time. Fine tuning of the layout is handled by the client device itself Systems of the invention were originally developed for Java ME. In certain embodiments, the system takes full advantage of the Java ME standards. All the normal features of mobile telephony, including SMS, MMS, and dialing can be used, as well as the capturing of images, audio and video that can be uploaded to the gateway server. With the introduction of the iPhone and other touchscreen devices, the system has been extended to support additional features available in these devices.

Interactivity is a key feature of systems of the invention, and many types of input can be facilitated by the client application. Users of the system can supply data items, which can be stored in a core database on the gateway server. User data items can include text, such as a user's name or a chat message. In addition to standard text and similar inputs, users can also take photos, capture video, record audio and upload the resulting multimedia files as input sent to and stored on the server.

User-supplied data items can be used as input to generate content dynamically, such that this input can be incorporated into content sections that are, in-turn, delivered to one or more users. In certain embodiments, data items are individual to an end user (i.e., a user's password, or private messages). In certain embodiments, a user's input becomes a group data item and is incorporated into content which is delivered to multiple users, for example photo sharing or group chats. User input data items can be dynamically incorporated into content as it is distributed, thereby creating end-user apps which can be influence in real-time by real-world events.

The gateway server allows content to be pushed directly to end-users, allowing content to be updated via the web interface and sent out automatically. By exploiting efficiencies designed into this process, good synchronization is obtained. Updates can also occur responsive to input requests.

In certain embodiments, there is a shared abstraction of Content Object types between client and server.

In order to make the inner app (i.e., the quiz, or the event, or the timepacket) executable, navigable and displayable on disparate client platforms, the various widgets and commands that constitute content app screen elements, navigation etc. exist as Java SE classes on the server, and they also exist as the equivalent Java ME or ported platform specific executables (e.g., Objective-C classes for iPhone) on the client side. The content app may thus be authored on the server, yet streamed and re-created as equivalent classes on the client, where they are interacted with by the outer app.

3. Multi-Phase Compilation

Content objects exist in sections, the basic quanta of content according to certain embodiments. In certain embodiments, content creation begins the authoring of a source section via the web interface. The source section generally comprises at least one high-level content object.

Source sections comprising high level content objects needs to be compiled in order to be processed by client applications. Compilation replaces high-level objects with low-level objects that can be understood, handled, or displayed directly by client applications.

On the server, sections are either handled as XML data, or parsed into objects. When sections are parsed, all their content (commands content objects, etc.) is parsed as well. XML parsing and writing is handled by the XML framework. Systems and methods of the invention supply a framework to process XML, which utilizes the SAX (Simple API for XML) parser (included as part of the Java software package).

Sections are created on the production server; compiled, and sent on via the gateway server to client applications.

The production server stores its data (apart from resources) in the production database. However, the production application does not have direct access to the core database, where end user data is stored. For this reason among others, section compilation is done in 3 phases; primarily in order to optimize performance by minimizing the amount of content that needs to be compiled separately for individual end users. In phase 1, content associated with data stored in the production database is compiled by the production application. In phase 2, end-user group content, associated with data stored in the core database, is compiled by the gateway application. In phase 3, individual end user content, associated with data stored in the core database, is compiled on an individual/as-needed basis by the gateway application. Each phase is discussed in more detail herein.

As can be seen from the foregoing, systems and methods of the invention provide functionality in the form of quizzes, surveys, and reports. As discussed above, in order to deliver the sizeable and complex content in a reliable and timely manner, systems and methods of the invention provide a multi-phased preparation process that sends only content that is immediately relevant to a client's navigated target. The multi-phased process also sends only content that has changed since the client last loaded it, and ensures that previously prepared content is not needlessly prepared again. Systems and methods of the invention enable real-time push of content to the client, and de-couple client connectivity and content preparation to a great degree, to create reliable interaction and flexibility in the hardware/software configuration.

FIGS. 1-4 illustrate the sequence of events for various scenarios for content preparation. In certain embodiments, the invention supplies system and methods for delivering content to a user that involves three phases. Phase 1 involves obtaining or creating a source section comprising content. Phase 2 involves compiling the source section a first time, producing what is called a dynamic section. Phase 3 involves re-compiling the dynamic section for each individual user, while reformatting it into a compiled section consisting of a series of binary packets and simultaneously sending it through a queue to the client.

In each scenario of content delivery, as illustrated in FIGS. 1-4, content is prepared in three phases. Phase 1 involves obtaining or creating a section comprising content. Phase 2 involves compiling the section a first time, producing what is called a dynamic section. Phase 3 involves re-compiling the dynamic section for each individual user, while reformatting it into a compiled section consisting of a series of binary packets and simultaneously sending it through a queue to the user. Each phase is herein explored in more detail.

Phase 1

In phase 1, content associated with data stored in the production database is compiled by the production application. XML source files are reconstructed into compiled dynamic sections, and user-independent high-level objects are replaced by low-level objects where possible. Compiled dynamic sections remain in XML format. Phase 1 compilation can be performed when a section is loaded, reloaded, and/or updated, as well as at regular intervals (as part of the production server's general maintenance routines).

The first step of Phase 1 compilation is to copy basic section information to the newly generated compiled section. Then the actual compilation takes place, whereby content objects are complied, and headers for images are generated and inserted. The section is then parsed and content objects are checked and compiled if required. All content objects have their individual compilation methods specified, and each type of object is compiled using that method. Web feeds (RSS, ATOM) are fetched at this point (and checked for updates at regular intervals by the server afterwards) and inserted as ordinary menus and text boxes. This is done only once for all end users and does not create any noticeable load to feed providers.

Phase 1 content preparation creates low-level output, in the form of one or more source sections, that is universal to all users of an application, but is not content generated by users (such as chats, comments, etc.). In certain embodiments, phase 1 preparation takes as input XML that has been authored by or for the content producer. This XML contains high level elements that will be transformed into lower level ones by phase 1. An example of this would be an ArticleList element being transformed into a Menu element containing MenuItem, TextBox and Image reference elements.

Sections produced in this phase are stored in memory and Gateways may be registered to receive updates. Phase 1 objects are flushed from memory if they are not currently needed, in order to conserve memory.

By separating the preparation of this data into a separate phase, timely delivery and client response time is optimized as this phase does not have to be repeated for every individually attached client needlessly. Bandwidth and server resources are also conserved.

Phase 1 preparation produces a dynamic section upon which phase 2 operates.

Phase 2

Phase 2 content preparation takes as input the XML output of phase 1 preparation. In phase 2, content that is user generated and can be considered universal to groups of users on the app is prepared. Examples of this kind of content are group chats (all users see the same chat) and public comments. Sections produced in this phase are stored as content objects in memory on the gateway server, where they are available to all registered listeners.

When phase 2 objects are first compiled, they are compared to previous version in memory if they exist. If an object is identified as being changed, new or deleted then this triggers the sending of only those objects to registered listeners. Communication with the client is still at the section level, but the section will only contain the affected objects. These objects will also replace the old ones in memory.

In phase 2, end-user group content, associated with data stored in the end user database, is compiled by the gateway application. Phase 2 compilation is essentially similar to phase 1, but without any image header generation. Phase 2 compilation is performed: after a phase 1 compilation; when a content update is required as a part of the synchronization process; or at regular intervals.

The input to phase 2 is a phase 1 compiled source section. Sections being used by a client application are termed "loaded". A section that is active on the gateway is opened as a dynamic section. Dynamic sections check for updates on the production server and are automatically synchronized with the source section, instantly pushing any changes to the client application. Each time an update is made, the dynamic section is recompiled. Phase 2 was created as a way of optimizing the compilation process by reducing the amount of content that needs to be compiled for individual end users.

In one exemplary embodiment according to the invention, a chat is a type of group content that looks the same to all end users, so it can be compiled in Phase 2.

Alternatively, a form is a type of content that contains different data for each individual end user (e.g. nickname, age, and other personal info) and each form needs to be compiled separately. Dynamic sections are prepared to be sent to the end-user client in the final phase of preparation, phase 3. To send a personalized form to an end-user, a generic (or "empty") version of the form would be supplied as a dynamic section, at least one data item individual to that end user would be retrieved from the core database, and the dynamic section plus the individual data item would be compiled into a compiled section in phase 3.

Phase 3

Phase 3 content preparation takes as input the (object) output of phase 2 preparation. In phase 3, content that is generated by individual users and which does not apply to groups of users is prepared. Examples of these individual data items are personal user inputs such as username or age. In addition, access level controls are checked at this stage, and objects which, for example, have been configured to not be visible to a certain user are removed. Phase 3 also finally creates binary artifacts in a packet protocol that is streamed to the client via socket communication (discussed in more detail under "Communication", below).

Individual data items, associated with data stored in the core database, is compiled on an individual/as-needed basis by the gateway application. After phase 2 compilation is completed, objects are split into separate packets to undergo Phase 3 compilation, and any required translations are made, before being delivered to the client application. After compilation and translation, the packets are output ready to be compressed and delivered to the client application.

Phase 3 compilation is performed when content is sent to a client application, including when an end user connects to the server, or when an update to a section is generated.

The access levels for both the end user and the content object are checked. If the user has access to the object, it is compiled. If not, the request is ignored. Compilation performed in this stage is object specific. If a translation is also needed, this takes place after compilation. Finally, the packets are added to an array, compressed, and sent to the client application.

This step is optimized carefully since it is done for every user. During this phase all individual data items are inserted. For example, a form containing personal information like end user name, age, sex etc. would be filled in with the individual's corresponding information as stored in the core database. User-defined web feeds are imported at this point (and checked for updates at regular intervals, on a unique feed basis).

The binary artifacts in the packet protocol created by phase 3 correspond to the individual widgets and other content that constitute a section, and these can exist as Java classes on the server and in equivalent ported format for the various platforms on the client. This is the manner in which the content app is made to be cross-platform.

Phase 3 output is not stored in memory as this data is produced on a per-client basis and is not re-usable by others. The output is put directly to the client's individual delivery queue.

In order to optimize delivery of content to the client, part of the multi-stage content preparation process involves the ability of the server to push changed content or events to individual clients.

As sections are prepared into packets ready to be delivered to the client, these are sent to client delivery queues, one per connected client. A fixed and configurable number of communications manager thread processes execute in the background in order to retrieve packets from these queues and send them to the registered listeners (clients). As a result of this architecture, output from content preparation is de-coupled from client connectivity, i.e. the output production is non-blocked.

In certain embodiments of the invention, plug-ins can be used to add to or modify client applications. If the additional functionality provided by the plug-in requires custom content compilation, this may require all 3 phases of the compilation process. It is also possible to create and/or use a custom compiler for a plug-in. For example, prior to phases of preparation as described above, the server checks for any other registered custom compilers, and runs these first.

4. Real-Time Content Updating and Synchronization

In certain embodiments, the invention supplies working interactions among the methods of multi-phase content preparation, content pushing, and event synchronization.

An important feature of systems of the invention is real-time synchronization of the content with the mobile application. If quizzes, surveys, events, or sections are edited and updated on the production server, the mobile application is automatically notified and immediately updated accordingly. There is no need to refresh screens manually on the client. Updates are only done for objects that have been altered. The entire section is not updated. Instead, the server automatically recognizes what objects have been updated when a section is saved, and updated data for only those objects is sent to the mobile application.

Content updating is handled from the gateway and the production application. Updates rely on listeners informing affected server components of changes. Whenever a section is updated on the server, the production application notifies listeners on the gateway. The production server can also update some content on its own, for instance by checking feeds at set intervals and updating information if needed. If a section is currently loaded, it is put through phase 1 compilation again as the content will have to be synchronized. Even though server updates are not reflected in the source section, and are not saved in the source XML, the phase 1-compiled section contain the server updated content.

For every connected user, the section the user is currently viewing is called a "loaded section". On the gateway server, sections can also be opened as dynamic sections, which are a special kind of loaded section that can be edited dynamically when there is an update. Dynamic sections use listeners that listen for any updates of the section on the production server. When a section is received from the server, it is first put through phase 2 compilation and obfuscated if obfuscation is enabled. If the section is updated, the current version of the section that the user is viewing is compared to the updated section and changes are identified. Any updates are compiled again and stored as packets. If a content object is added or changed, a new content object packet is added, if a theme is sent, the appropriate packet is added, and so on. The dynamic section is then changed to match the updates. This entire process is called "filling" the dynamic section. After the section is filled, and all changes are made, the packets are ready to be sent to the client. Just before sending the packets, they are each put through phase 3 compilation, and then finally sent as compressed packets. In certain embodiments, compression is done using Huffman encoding.

Content updates are sent to the clients using PUSH technology over TCP socket connections. As the updated objects are pushed to the mobile devices, updated content is delivered to the end-user almost immediately—within about one second. Not all mobile devices support TCP connections, however. When this is the case, HTTP communication is employed. Content updates over HTTP connections can not be done using the PUSH technology, so instead updates have to be done using polling (HTTP requests are made with regular intervals, checking if there has been any content updates).

To further improve synchronization of events (e.g. questions in live games), a special method is used to counter latency issues, as well as synchronizing the system time of the server and the device. First, the client application sends a request for the current server time. The amount of time it takes for receiving a response from the server is the Round-Trip-Time (RTT). The server tries to handle such requests as fast as possible so the RTT is minimal. By adding half the RTT to the server time, the client application time is fairly well synchronized with the server. Events used in live games are usually sent to the client beforehand, and then invoked at a time defined in the event. Since the server and client times are so well synchronized, the event invocations are synchronized at a very good resolution of about one second.

5. Events, Quizzes, Surveys, and Reports

Events

In certain embodiments, an event is used to give clients an opportunity to participate in a quiz or survey, and deliver of such content is synchronized with good resolution. For example, an event is invoked on the production server, ultimately causing a client application to display to a client one or more questions of a quiz or survey.

Events can be sent in an ad hoc fashion by the producer, or they can be sent by the Timecode Manager as a result of scheduled relative timecodes (authored by the content producer) in relation to an external start signal (e.g. the manually signaled start of a quiz).

In certain embodiments, systems of the invention deliver functionality unique to the invention by providing events. For example, there is no equivalent to events in the Mobile Information Device Profile (MIDP) specification published for Java. Events allow the server to control single or groups of client applications, creating what is effectively an intranet of mobile devices linked to and controlled by the server. Events, like commands, invoke objects, however commands are issued by the end user, and events are issued from the server.

Events contain a unique ID, a Target Section and a Target Object which together make up the address specifying which object in which section the event should invoke.

Events can also contain time attributes specifying how and when the event should be triggered. These time attributes can include Delay, Issue Date, and Issued. Events can also be synchronized to time code, and used by the server to drive different kinds of live and/or real-time applications. These attributes can be used to deliver a specified displayable object at a pre-defined time. Events can also contain an access level to control which users or user groups will be sent the target section and/or object by the server.

Events can contain nested content objects, which will be sent by the server (along with the event) to client applications. This allows events to be used for content delivery. This can be used to display a specified displayable object at a pre-defined time.

Events can be created either by producers using the Web interface, or be created automatically by the server at specified times. Events are only sent to end users who have the target section of the client application open on their devices. Events are used to drive live games and quizzes. Table 1 lists information contained by an event.

TABLE 1

Information contained by an event

| Name | Description |
| --- | --- |
| ID | A unique identifier |
| Target section | Id of the target section (optional) |
| Target object | Id of the target object (required) |
| Delay | Delay for invoking the target object once the event has been issued |
| Issue date | Date and time when the event should be issued |
| Issued date | Date and time when the event was issued |
| Access level | Access level of the event |
| Nested objects | Content objects contained in the event |
| At when | At when the event should be triggered |
| Target | The target to invoke on the target object |

When an event is triggered, its specified target object is invoked.

The following XML supplies an example of an event according to certain embodiments of the invention.

```
<event target_section="1" target_object="TBox">
<textbox id="TBox" title="Sample" text="This is a sample text box">
<cmd id="back_cmd" target="back"/>
</textbox>
</event>
```

In this example, an event is sent to end users currently viewing the object main_menu in the section which has an id of "1". The event displays the text box TBox to the end users.

The event includes the text box, as well as a back command, allowing end users to return to main_menu when they have finished reading the text box.

The text "This is a sample text box" will be displayed on the mobile device as soon as the event is received by the client application, for example, substantially instantly (milliseconds later), as no time delays have been specified.

However, this example is just for illustration purposes. Events of the invention provide wide-ranging functionality. In certain embodiments, they are used to initiate or propel a quiz or a survey.

Quizzes and Surveys

In certain embodiments, the invention supplies systems and methods for creating quiz-style games. A quiz is a game where a user is presented with questions and receive points for correct answers. Quizzes according to the invention are represented by a quiz content object. A quiz is made up of questions. Questions are created as separate content items. Table 2 lists different types of questions depending on what format the answer is expected to have.

TABLE 2 types of questions

| Question Type | Answer Type |
| --- | --- |
| Date Question | Date input (dd.MM.yyyy HH:mm:ss) |
| Numeric question | Numeric input (integers) |
| Text question | Text input (strings) |
| Multi Choice question | Multi choice input |
| Single choice question | Choice input |

The different types of questions are directly tied to the different kinds of user input recognized by the system. A multiple choice question contains answer alternatives, from which the user must select one or more alternative as the answer. A single choice questions also contains answer alternatives, but the user can only select one of the alternatives as the answer.

The questions are presented according to a quiz schedule. Schedules are also content items. A quiz schedule is a time schedule for when each question should be displayed. Quizzes can be time-based, with each question being presented at a relative time specified in the schedule (relative to when the quiz is started). Questions can also be presented one after another with no delay in between. Quizzes can also be live. Live quiz games work according to the quiz schedule. The quiz is started at a certain time, and after specified intervals a question is shown to the user. This requires that the schedule is agreed upon beforehand, so that the schedule can be made to display the questions at the correct times. Apart from questions, schedules can also contain quiz text boxes, which can be used to present information or display scores. Schedules can also contain quiz objects items, which can contain one or several content objects. Just like the questions, text boxes and object items are displayed at the time (or in the order) that is defined in the schedule. The actual questions are compiled as input object and sent along with the section where the quiz is specified. The questions are not displayed right away, however, but controlled by the quiz schedule. Whenever a question should be shown to the user, the server sends a quiz event to the mobile application invoking the input object that represents the question. The schedule can either be started automatically at a specific time, or be started manually from the web-interface. Table 3 lists parts of quizzes.

TABLE 3

Quiz parts

| Quiz Item | Description |
| --- | --- |
| Quiz Question | See table above |
| Quiz Schedule | Schedule describing order and timing of quiz items |
| Quiz Text Box | Text box, which can contain text and be displayed in a quiz |
| Quiz Objects Item | Item, which can contain content objects to be displayed at some point in the quiz |

In certain embodiments, the invention provides applications that can be used along with TV game shows, allowing viewers to participate live during the show. By creating a schedule ahead of time, which times the questions with the TV show, the user will be presented with each question at the same time as it is presented on the program. This allows users to compete against each other while watching the show, providing viewers with an interactive experience while watching.

In certain embodiments, the invention also supplies objects for calculating scores and displaying top lists showing which users scored the best in the quiz. Points for questions are specified in each question item. For instance, in a multiple-choice question, each alternative is given a numeric value indicating how many points the alternative is worth. If there is only one correct alternative, and each question is worth one point, the correct alternative would be assigned a value of one point, and all other alternatives a value of zero points. After a quiz has ended, scores are calculated per user, and a top list can be created by comparing scores. The results can be shown to users using either the quiz question results or quiz result list content objects. Both represent a menu, containing results for questions. The results are presented for each question, showing in percentages how many users answered what alternative. The difference is that in a quiz result list, the statistics are displayed as a chart, and in a quiz question results object only numerically. A user's individual information can easily be shown using text variables. Predefined text variables can include, for example: ${user}, ${score}, ${maxscore}, and ${toplist(_schedule( . . . ))}.

The graphical representation of quiz results are done as "pollgraphs". A pollgraph is a displayable content object, representing a graph made up of a number of bars. Depending on settings, the bars can either be horizontal or vertical, and the graph can be set to display percentages (the sum of the all the values each bar represent are 100 percent). Basically, pollgraphs are a graphical representation of voting that can be displayed in real-time. The result shows the percentage of the vote each option has gotten so far.

Quizzes that do not use a timed schedule can be taken offline. Offline quizzes uses separate compilation methods. This is because an offline quiz must be able to run without any interaction with the server, so the questions have to be invoked on the client at the right time, and the final results have to be saved on the client and be sent once the client can connect to the server again. Systems and methods of the invention allow quiz questions to be delivered synchronously, even while a particular device is offline.

Quiz questions can be presented in a random order. The randomization is done during the final compilation phase, meaning that each user is (potentially) presented the questions in a unique order.

In certain embodiments, systems and methods of the invention provide tools for synchronizing a survey. A survey is fairly similar to a quiz, as it consists of questions and user supplied answers. Surveys use the same question and schedule content items as quizzes do. As surveys are not games like quizzes, but instead all about gathering statistics, the scoring features of quizzes are not typically used. Instead the user is presented with questions according to the schedule and the answers are recorded (just as they are with quizzes). If, for example, the content of the question itself is desired to kept secret from the end-users at-large until the delivery of the survey, synchronizing the delivery of the survey according to the invention can be valuable.

As with quiz results and result lists, the answers from all users that have taken a question can be compiled into statistics and displayed either to end-users or retrieved from the server. Survey results can be displayed graphically in the web-interface, using open flash chart, or downloaded as CSV, XML or open flash chart JSON files.

In one exemplary embodiment of the invention, the "quiz" is a client side survey, which uses the schedule with id 1. The quiz content object is a part of a section. The schedule with id 1 is called "survey schedule" and contains three questions. The schedule is stored as a separate content item. Finally, the question with the id 2 is the first question that is displayed. It is a single choice question with two alternatives.

Reports

In certain embodiments, the invention can receive or retrieve data and prepare reports. Reports involve the ability to customize how data from surveys or quizzes is retrieved and output. In certain embodiments, reports are created as XML documents, detailing various options regarding how the data will be printed or presented, as well as allowing a user to select which data to output. A report can contain schedules. Schedules can contain "survey items" and "events", which are form answer items recorded in the database and quiz questions within the schedule. Note that automated data collection (what web-page is each device viewing) or the delivery of reports can be synchronized according to systems and methods of the invention.

6. Communication and Data Format

In certain embodiments, content objects are encoded as proprietary binary packets and are pushed in real-time to the client. This is typically done using a Java socket but can also be done using HTTP. The system contains logic to fall back to HTTP communication if socket communication fails. The HTTP equivalent to a server-side push is simulated using polling from the client side.

In certain embodiments, updates are pushed from the server in real-time. In order to optimize delivery of content to the client, part of the multi-stage content preparation process involves the ability of the server to push changed content or events to individual clients.

As sections are prepared into packets ready to be delivered to the client, these are sent to client delivery queues, one per connected client. A fixed and configurable number of communications manager thread processes execute in the background in order to retrieve packets from these queues and send them to the registered listeners (clients). As a result of this architecture, output from content preparation is de-coupled from client connectivity, i.e. the output production is non-blocked.

In order to optimize reliability of content delivery to the client, part of the multi-stage content preparation and delivery process involves the ability of the client and server to fall back to plain HTTP communication in the event that the regular (preferred) socket communication does not work.

Regular client communication is performed using 2-way communication over a socket connection between the Gateway Server and the (outer) client app. In the event that this connection does not work for whatever reason, it is replaced by a simulated connection over HTTP. This connection is maintained by the client polling a Gateway server HTTPServlet (which is the manner in which content may still be pushed over HTTP).

Systems and methods of the invention provide several independent server applications, a web-interface and mobile clients. Communication between these parts of the system is done either over a Java socket port or HTTP port 80. Both communication protocols are used in order to accommodate differences in both mobile device configurations and the varying reliability of raw socket ports compared to HTTP port 80 communication at various telecoms. All internal server communication between server applications, as well as communication between the web-interface and the servers is done using the socket connection. Communication between the server and the mobile client applications is done over socket if the device supports it and is available at runtime, or otherwise over HTTP. Systems and methods of the invention function according to the same inventive concept without regard to the type of communication, thereby producing the result that devices are synchronized with good resolution, regardless of connection type.

Whether using a socket port or HTTP port 80 connections, the payload is a binary artifact comprising packets according to a packet protocol supplied by the invention. There are more than fifty different kinds of packets extending the base class, which carry different kinds of information (such as event packets, different kinds of answer packets, content-object packets and so on). The packet format is simple Each packet consist of a small header, containing information about what type of packet it is and what length the packet is. Packets are sent using Java DataOutputStreams, with the packets encoded as byte arrays. The packet format is shown in Table 4.

TABLE 4

Packet format

| Field size | Field name | Field content |
| --- | --- | --- |
| 2 bytes | type | Packet type identifier |
| 4 bytes | length | Payload length (in bytes) |

XML

In certain embodiments, all content is stored in an XML format and much internal communication on the servers uses XML. Systems of the invention provide an XML framework. The framework is implemented using a facade design pattern over the Java SE SAX parser.

Sections are parsed into individual XML elements. Some elements are mandatory for each section, such as a header (containing the section id) and a main object (used as the entry point for the application described in the header). Optional section elements that are parsed are content objects, server objects (high-level objects that are only used on the server), styles and themes, section properties and obfuscating rules.

All objects are then parsed according to methods specific to the object. Object types are identified using integer values. Content objects are first divided according to type, and then the content is parsed further according to methods specific to the type of the object. In reality, the parsing takes all information out of the XML elements and places it in arrays, containing attribute-value pairs. This makes handling objects easier. Content is sent to the clients using this parsed format as binary-encoded packets as shown in the example below.

Communication on the server is mostly done using XML packets. XML packets are written to output/input streams using an XML writer that is a part of the XML framework.

Binary Format

Before packets are sent from the server to the client application, or vice versa, they are transformed into a binary format instead of XML. Packets are sent with an encoding, using the packet format above. XML is not used on the clients, so all content objects are sent as binary packets between the client and the server. An example of a binary "content object" packet looks as follows:

The original XML data:

```
<menu id="menuid" style="menustyle" default_cmd="sel_cmd"
title="My menu">
<cmd id="sel_cmd" target="_select"/>
<cmd id="back_cmd" target="_back"/>
<item id="item0" target="someobject"/>
<item id="item1" target="anotherobject"/>
<item id="item2" target="_exit"/>
</menu>
```

After XML parsing, the menu object is made up of an array of menu items, and an array of commands. Each Item and command has an id and a target. The information is then converted to a byte array, and sent using a Java DataOutputStream

| Field size (bytes) | Field description | Field content |
| --- | --- | --- |
| 2 | Packet type | "1" (content object) |
| 4 | Content length | "136" (packet content length in bytes) |
| 2 | Object type | "1" (menu) |
| 2 + 6 | Object id | "6" (length of string) + "menuid" |
| 2 | Menu item count | "3" |
| 2 + 5 | Item[0] id | "5" + "item0" |
| 2 + 10 | Item[0] target | "10" + "someobject" |
| 2 + 5 | Item[1] id | "5" + "item1" |
| 2 + 13 | Item[1] target | "13" + "anotherobject" |
| 2 + 5 | Item[2] id | "5" + "item2" |
| 2 + 6 | Item[2] target | "6" + "_exit" |
| 2 + 7 | Menu title | "7" + "My menu" |
| 2 | Command count | "2" |
| 2 + 7 | Command[0] id | "7" + "sel_cmd" |
| 2 + 8 | Command[0] target | "8" + "_select" |
| 2 + 8 | Command[1] id | "8" + "back_cmd" |
| 2 + 6 | Command[1] target | "6" + "_back" |
| 2 + 7 | Default command | "7" + "sel_cmd" |
| 2 + 9 | Object style | "9" + "menustyle" |

Actual binary packet:
00 01 00 00 00 88 00 01 00 06 6D 65 6E 75 69 64 00 03 00 05 69 74 65 6D 30 00 0A 73 6F 6D 65 6F 62 6A 65 63 74 00 05 69 74 65 6D 31 00 0D 61 6E 6F 74 68 65 72 6F 62 6A 65 63 74 00 05 69 74 65 6D 32 00 06 5F 5F 65 78 69 74 00 07 4D 79 20 6D 65 6E 75 00 02 00 07 73 65 6C 5F 63 6D 64 00 08 5F 5F 73 65 6C 63 6D 64 00 08 62 61 63 6B 5F 63 6D 64 00 06 5F 5F 62 61 63 6B 00 07 73 65 6C 5F 63 6D 64 00 09 6D 65 6E 75 73 74 79 6C 65 XML size: 267 bytes Binary size: 142 bytes The multi-phase content preparation process intentionally decouples client connectivity from content preparation, in order to optimize the user experience in terms of client connectivity and interactivity.

If phase 1 has any problems creating new content, the old content stays in memory so that client interactivity is not affected. Indeed, the production application, as hosted for example on a production server or in a production JVM if hosted on the same server as the Gateway(s), can be restarted at will without affecting client navigation and interactivity.

A natural consequence of this is that the synchronization according to systems and methods of the invention functions even if components of the system, such as the production server, are off-line at the desired event time.

7. The Applications

In certain embodiments, the invention provides four applications, each of which can optionally be supplied in a dedicated server: production application; user application; entry application; and gateway application. In certain embodiments, the invention includes a web interface application. Systems and methods of the invention supply the ability to create content, process and compile the content, maintain end-user connectivity, distribute the user (outer) applications, and distribute the compiled content to the user applications.

Figure 2:
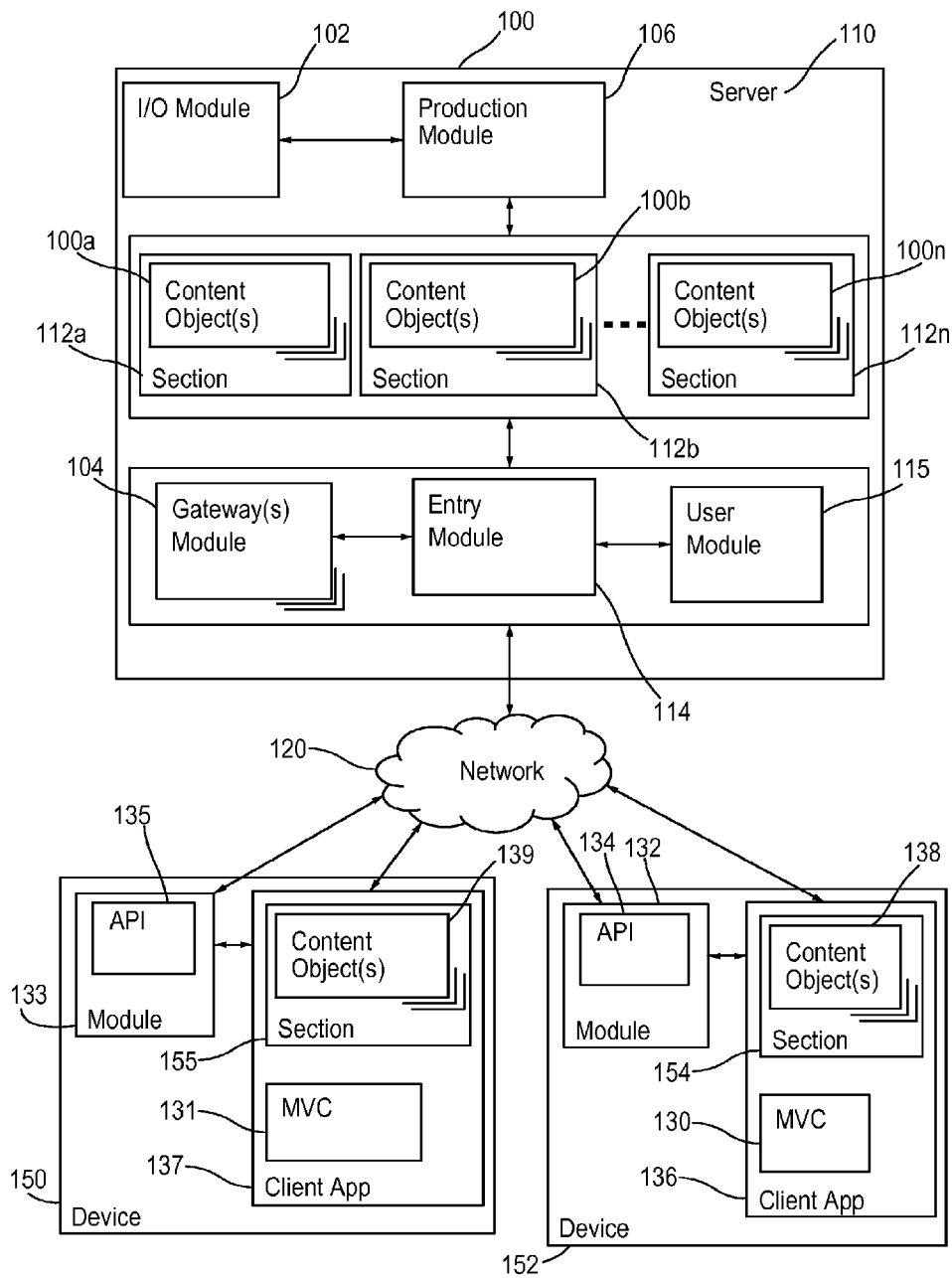
FIG. 2 is a block diagram of systems according to certain embodiments of the invention.
Figure 3:
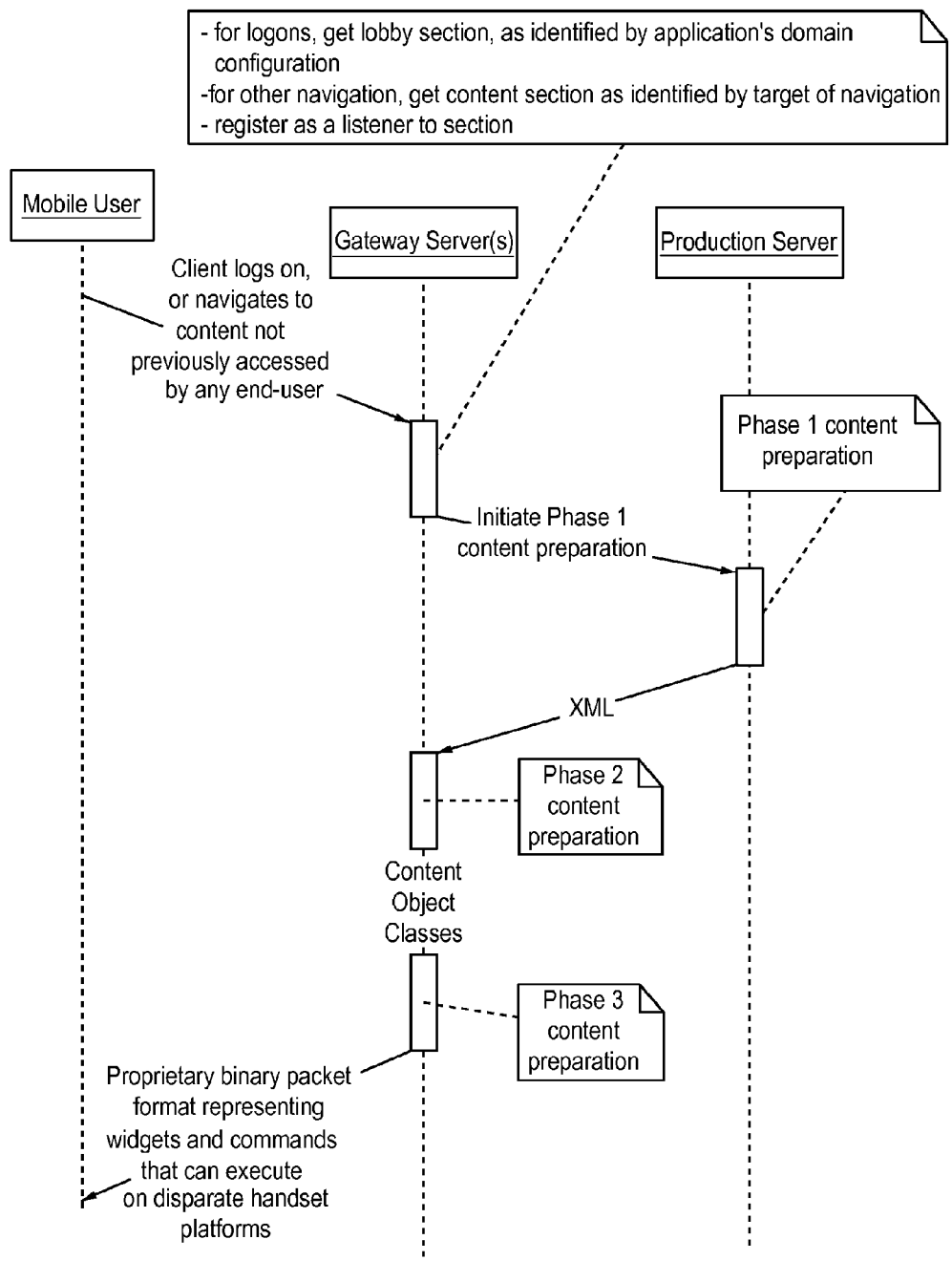
FIG. 3 illustrates multi-phase content preparation as a logical sequence as a result of client navigation.
Figure 4:
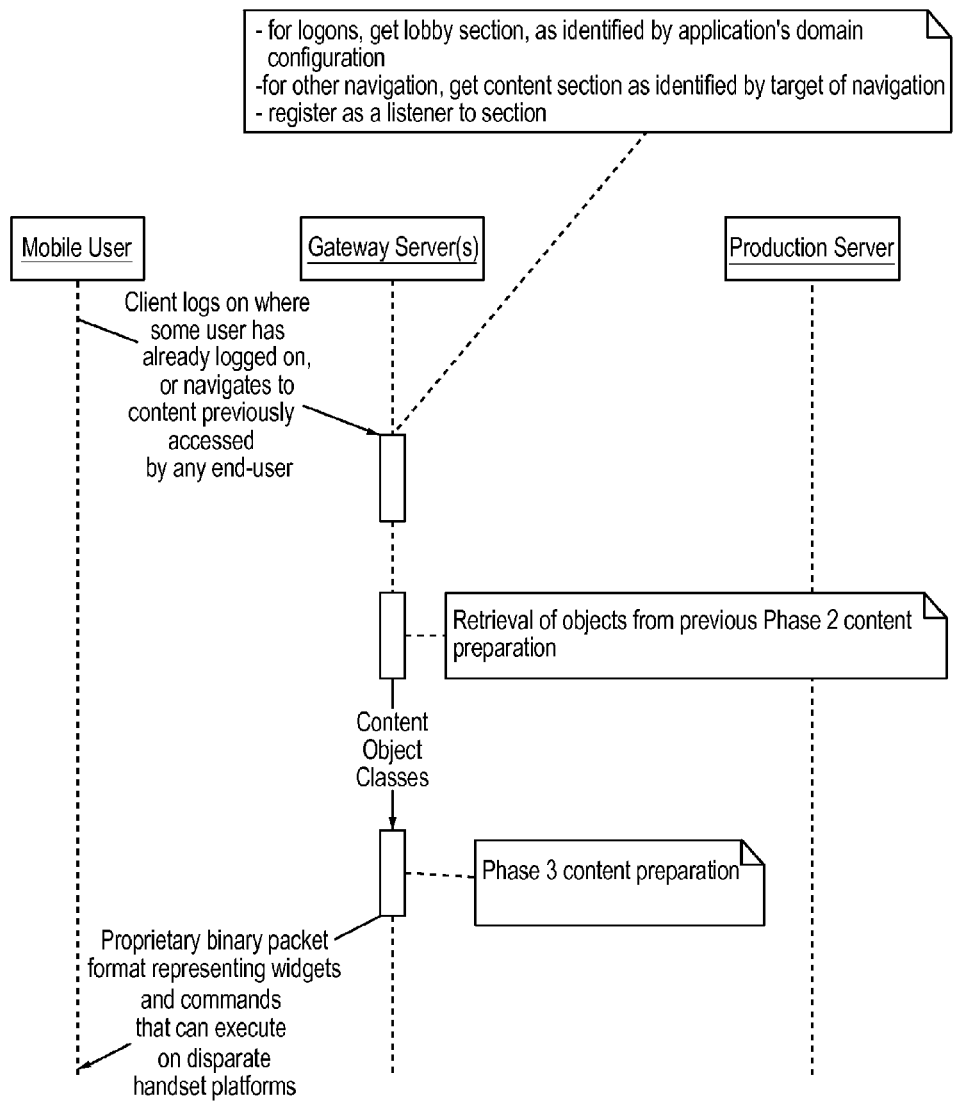
FIG. 4 illustrates multi-phase content preparation as a logical sequence as a result of client navigation where content already exists.
Figure 5:
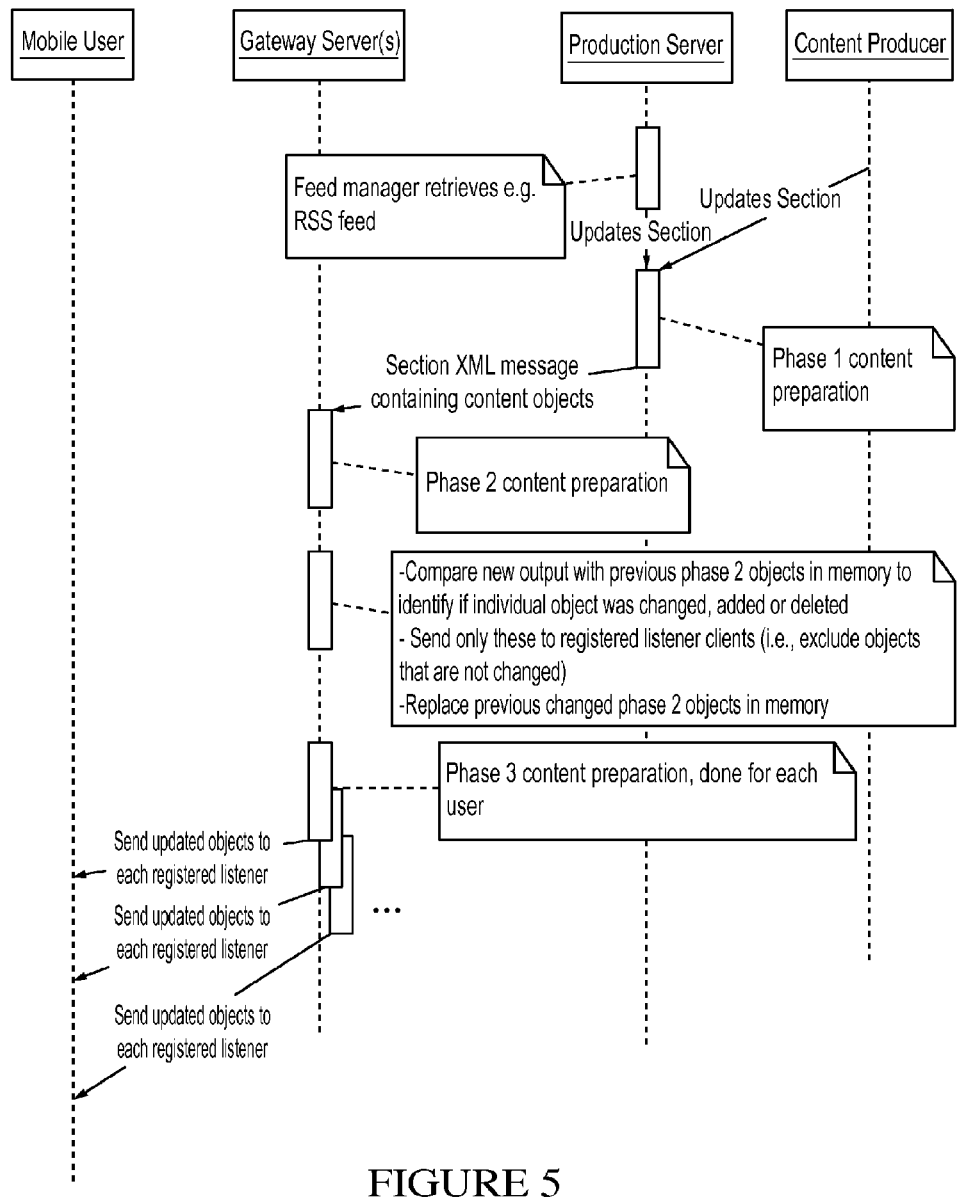
FIG. 5 illustrates multi-phase content preparation as a logical sequence as a result of content changing on the server.
Figure 6:
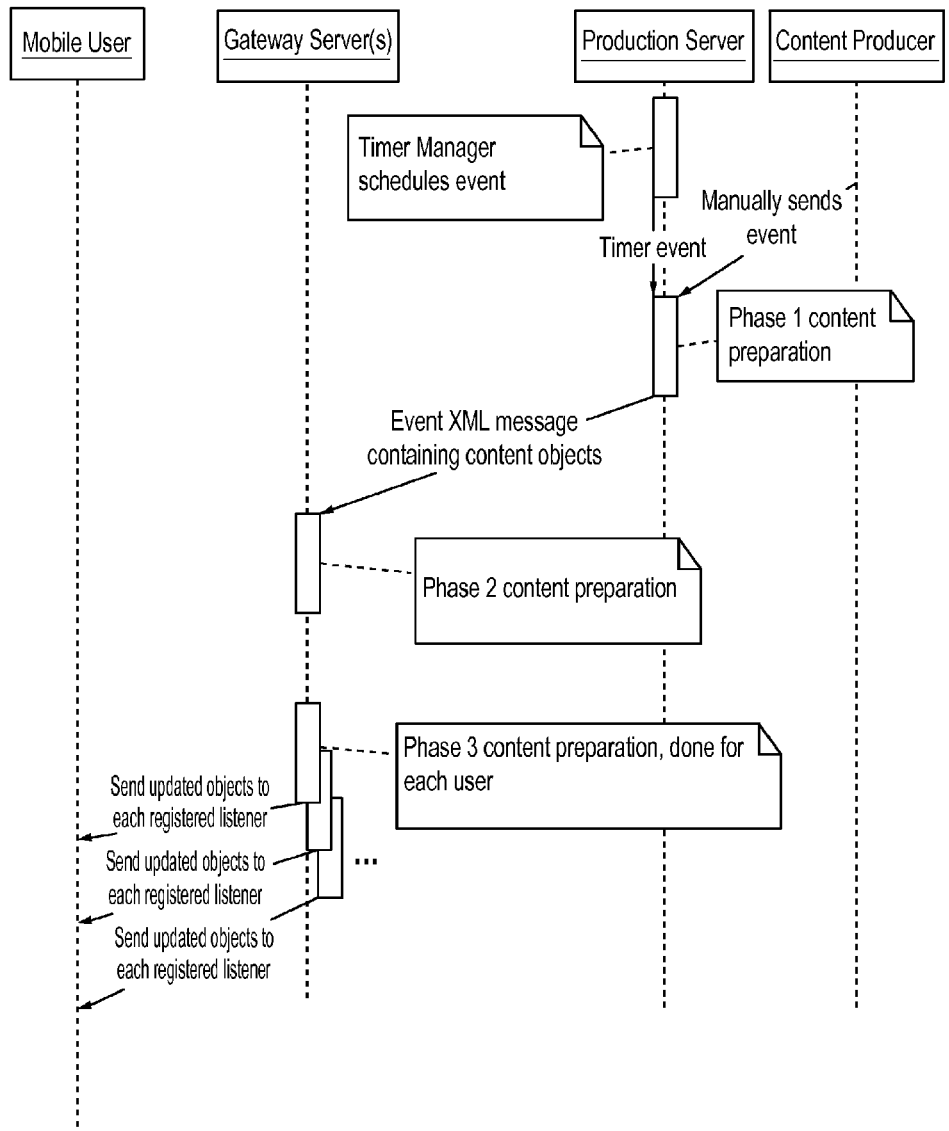
FIG. 6 illustrates multi-phase content preparation as a logical sequence diagram as a result of events.

FIG. 2 provides a block diagram of systems according to certain embodiments of the invention. In certain embodiments, the invention includes a production module 106 accessed by a producer through an input/output module 102. Sections 112a-112n are authored via the production module and sent to one or more gateway modules 104, which compiles them. Each section may contain one or more content object 100. Optional entry module 114 and optional user module 115 coordinate communication among client app 137 on device 150, client app 136 on device 152, and the one or more gateway 104 over network 120. In some embodiments, each module is an application. In some embodiments, each module is provided by a dedicated server.

Client app 136 receives a section 154 containing one or more compiled objects 138. Module 132 generally includes a platform such as Java or iOS, which supplies an application programming interface (API) 134. Client app 136 includes a model view controller (MVC) 130 that controls communication with the server; re-creates content object 138 as it is streamed from the server 110; controls interaction between one or more content object 138 and any other content object(s); and interfaces the one or more content object(s) with the native hardware API 134.

Client app 137 receives a section 155 containing at least one compiled object 139. Module 133 generally includes a platform such as Java or iOS, which supplies an application programming interface (API) 135. Client app 137 includes a model view controller (MVC) 131 that controls communication with the server; re-creates the at least one content object 139 as it is streamed from the server 110; controls interaction between the at least one content object 139 and any other content object(s); and interfaces the at least one content object with the native hardware API 135.

System 100 includes a number of modules. In certain embodiments, these are included in server 110. In alternative embodiments, each module is provided by a dedicated server, or some modules, for example gateway module 104, entry module 114, and user module 115, are provided as applications on server 110, while production module 106 is provided on a separate, dedicated server. In some embodiments, input/output module 102 is a web interface.

In some embodiments, server 110 is a computer-based machine containing a set of instructions for causing the machine to perform any one or more of the methodologies discussed herein. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. For example, in certain embodiments, production module 106 is a client machine and gateway module 104 is provided by a server machine 110 in communication with the client.

In various embodiments, machines of the invention can be, as necessary to perform the methodologies described herein, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while server 110 is illustrated as a single machine, the term "machine" shall also be taken to include any collection of machines that individually or jointly execute a set (or multiple sets) of instructions to perform any one or more of the methodologies discussed herein.

As one skilled in the art would recognize as necessary or best-suited for performance of the methods of the invention, devices 150 and 152 are also computer machines. In a preferred embodiment, they are each handheld computing devices such as smartphones, iPhones, tablet computer, laptops, PDAs, computers, or e-readers.

As one skilled in the art would recognize as necessary or best-suited for performance of the methods of the invention, computer systems or machines of the invention include one or more processors (e.g., a central processing unit (CPU) a graphics processing unit (GPU) or both), a main memory and a static memory, which communicate with each other via a bus. Computer systems or machines according to the invention may further include a video display unit (e.g., a liquid crystal display (LCD) or a cathode ray tube (CRT)). Computer systems or machines according to the invention can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

A disk drive unit according to the invention can include a machine-readable medium on which is stored one or more sets of instructions (e.g., software 424) embodying any one or more of the methodologies or functions described herein. The software may also reside, completely or at least partially, within the main memory and/or within the processor during execution thereof by the computer system, the main memory and the processor also constituting machine-readable media.

The software may further be transmitted or received over a network 120 via the network interface device.

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories (e.g., subscriber identity module (SIM) card, secure digital card (SD card), or micro SD card), optical and magnetic media, and any other tangible storage media.

In certain embodiments, the invention includes four stand-alone applications which supply different functionality. These applications can be partitioned physically, for example as separate machines or servers, or logically, for example as separate Java virtual machines. In certain embodiments, they can all be run on the same machine and JVM. This logical partitioning of the server allows for scalability. For example, multiple gateways can be configured as required to handle increasing numbers of connected users. The partitioning also allows for updating only parts of the applications or servers at a time, meaning that the entire system does not need to be taken offline for updates. Similarly, a crash in one of the server applications will not cause the entire system to crash.

Internal communication between the different applications is done over TCP/IP, using sockets. All data is sent as packets, using simple packets consisting of a small header and a payload containing data.

Production Application

The production application handles creation and storage of content and resource files (images, video clips, etc.). In certain embodiments, the production application is housed in a dedicated production server, either as a server computer or within a virtual machine. In certain embodiments, the production application controls all other server applications and connects them together. Producers use the production application to create content. The production application handles the phase 1 compilation of sections and imports external contents like web feeds.

In certain embodiments, the production application is a stand-alone application. The application run on an individual server, communicating with the other applications, as well as the web-interface, over TCP/IP. The main responsibility of the production application is to facilitate content creation. The production application is also the central application on the server, connecting the other applications together.

Producers can create content using the web-interface to access the production application. Content is then sent to the production application. The production application handles the incoming content. All the communication (apart from between the producers and the web-interface) is done over TCP/IP socket connections. The content is sent as XML packets using the packet format. The gateway application(s) handles distribution of content to the end-users. The gateway application works as an intermediate link between the production application and the end-users, forwarding requests for content from end-users to the production application or pushing out updated content from the application to the end-user, ensuring that the content is synchronized between the server and the end-users in real-time.

The production application handles all the different kinds of content, including sections. Content is stored by the production application in the production database. In some embodiments, the production application is provided by a production server, and the production database is a component of the production server. All content items are stored in sections. In certain embodiments, sections are stored as XML files. Sections are parsed when handled by the applications. In certain embodiments, there is also some static syntax checking done on sections as they are saved. Resources are also stored in the database.

User groups are used for selective content distribution, allowing content to only be available for end-users that belong to a certain user group, but still synchronized in terms of delivery to members of the group. The user groups that are given or denied access to content is defined as access levels for the content whose access should be controlled. Groups can be added, updated and deleted from the production application. The first phase of section compilation is also done on the server. During the first stage of compilation, high-level content is compiled and replaced by low-level content. This includes fetching web feeds and replacing them with textboxes and menus in the section, gathering quiz results, fetching and inserting articles and article lists as well as inserting headers for images and other resources into the section. The production application also handles the system user-producers, using the LDAP protocol.

User Application

The user application handles end-user registration, stores user data and synchronizes the gateways with each other. The user application also handles the sending and receiving of SMSs. The user application handles individual end-user information such as messages. In certain embodiments, the user application is run as an individual user server, communicating with the production server and the gateway server(s) over TCP/IP, as well as handling SMS communication with the end-users. The main responsibilities of the user application is to handle end-users and incoming SMSs.

The user application handles the end-users, who, in a sense, are the mobile devices that run the mobile application. New users initially connect to the entrance application, which redirects the users to a gateway application after the mobile application is downloaded and installed to the end-user device. The user application can then communicate with the end-user via the gateway application, which passes packets between the user application and the end-user. All communication is done over TCP/IP sockets, using the packet format.

Initially, end-users are identified by their phone number, but as soon as a new end-user has installed the mobile application, a new user is registered in the user application. In the system, the users are then identified by an assigned user id. The id and various other information such as registration date, registration info, last log-in time as well as optional information such as nickname, sex and birth date is stored in the database. Optional information is often gathered by an application, and can then be stored in the core database for use in other applications.

When a user connects to the system, a session is created, representing the connection. For each session, information is saved, such as ids for the session and the user, login and logout times, as well as the address the user connected from.

Users can belong to any number of user groups. The groups are used to selectively distribute content or events only to select users that belong to a certain group. User groups can be added and edited from the web-interface.

End-users can also send answers of different kinds, such as text answers, images, video files or audio files. The user application receives files and stores them in the appropriate place (for instance, files in the file system, other answers in the database). Many answer types can also be stored as resources and then be used by the application. For example, text answers can be displayed as an answer list to create a chat or comment list or photos can be saved as resources and viewed as photo albums. Users can upload files if the application needs it. The user application handles the uploading and storage of these files. Depending on if the file is an image, a video file, an audio file or some other kind of file, the user application creates appropriate folders, tables, or variables for these different kinds of files in the file system or database and stores uploaded files there.

The access level controls which user has access to what. Most objects can have an access level; content objects, articles, events and so on. The access level provides a very powerful way to allow or deny access depending on the user, group time or whatever. The access level contains a number of access rules that are applied in ascending order. Users are matched with the rules and are denied or allowed when they match which in the end makes a very flexible way how to give and deny access to different items.

The user service also handles sending and receiving SMSs, as well as synchronizing the gateway applications with each other.

Entry Application

The entrance application (or "entry application") handles the load balancing between the gateways and redirects the users to the gateways. The mobile application is downloaded from the entry application.

The entrance application allows client mobile devices to receive the mobile application. In certain embodiments, the entrance application is run as an individual server, communicating with the production application over TCP/IP, and with the end-users over HTTP. The main responsibility of the entrance application is to handle the distribution of the mobile application.

The entrance application handles the distribution of the mobile application. The end-user typically will order an application by sending a registration SMS to a phone number. The device is then identified using the user agent HTTP header (this is not always possible, meaning that some users can not be identified, either because of the device or interfering systems used by the operator). When identification is possible, the entrance server registers a new user with the user application (if the user does not already exist), and generates a ticket which identifies the registration and the user. The ticket consists of a unique numerical id and a random pass phrase, which is generated. Using the ticket, a unique download URL is generated for the user, and sent back to the end-user in an SMS. By following the download link, the user can then download and install the appropriate version of the mobile application to the device.

Once the mobile application is installed, the mobile application then contacts the entrance server. The entrance server then responds with one or more addresses for gateway servers, redirecting the communication to the gateways. By controlling the addresses to the gateway servers, the entrance application can effectively balance the load on the gateways. In certain embodiments, different gateway addresses are stored in a MIDlet JAD-file, indicating which gateways are set up to handle that specific application.

Gateway Application(s)

The gateway application handle the end users, sending them the content and receiving incoming data from them. The system can contain any number of gateways, which makes it scalable to a large number of users. The gateways keep track of each connected user in a very secure and detailed way. In certain embodiments, one or more gateways are run as one or more individual servers, or within one or more virtual machines.

The gateway application sends compiled sections to mobile devices. In certain embodiments, the application is run as an individual server, communicating with the other applications over TCP/IP. The gateway can also communicate with the end-users over the appropriate protocol, which depends on the device (TCP/IP or HTTP). The main responsibility of the gateway application is to handle the connection and communication with the other server applications and the end-users.

The gateway application handles nearly all communication with the end-users, as well as communication with the production application, the user application, and the core database. Some communication with the end-users is also done by the entrance application, like distribution of the mobile application. Communication with the end-users is done over TCP/IP socket connections when possible, or alternatively over HTTP depending on the end-user device. The gateway upholds the connection to the end-users, and keeps track of all connected users.

The gateway application handles sending and receiving data to or from the end-users, ensuring that the correct user gets the correct data, and trying to eliminate any redundant data being sent to users. All communication is done as packets, using the packet format. The gateway application is scalable. Many instances of the gateway application can be run at the same time if the need arises. The user application handles synchronization between the gateways. Sections are compiled further in the gateway, producing the final XML that is sent to the end-user. The sections are compiled in two more phases here, compiling high-level objects that are user specific into low-level objects that can be displayed on the end-user device. The final, compiled XML contains no high-level objects, only low level objects that can be directly displayed as screens on the end-user device.

Web-Interface

The web-interface is a standalone web-application that is used for adding and editing content. The web-interface communicates only with the production application, and is used as the interface between producers and the server.

Systems of the invention include an input/output module 102. In some embodiments, this is a web interface. The web-interface can be accessed from anywhere using a web browser. Using the web-interface, it is possible to add, manage, delete and edit content, which in turn is organized under a specific project. When creating or editing content, a producer can specify a time at which a function is to be exhibited. This desired even time can be included, for example, in quiz items. It can also be used to control, for example, when a new article is published.

The web-interface contains a content manager, which can be user to add new articles, quiz items or quiz schedules, as well as to view any existing content items. Since certain content such as articles can be generated automatically from feeds, the content manager is also a nice interface for viewing and editing generated articles, as well as for controlling different content categories (articles and quiz questions can optionally belong to a category). It is through these mechanisms that a producer can control when content, whether written by the producer, previously obtained through a feed, or expected to be obtained through a feed in the future, is exhibited to an end-user. It is also possible to create and edit quiz questions in a graphical way, making it easier to create new quizzes and surveys by, for example, supplying the option of defining conditional questions. Such questions are only shown as follow-up questions, based on how a user answered a previous question. Even such conditional content as conditional questions can be delivered synchronously according to systems and methods of the invention.

Incorporation by Reference

Systems, methods, and devices of the invention are also described in U.S. Patent Publication 2012/0089668, application Ser. No. 13/269,241, filed Oct. 7, 2011, under and also claiming priority to U.S. Provisional 61/391,272, filed Oct. 8, 2010, by the same inventors and titled MULTI-PHASED AND PARTITIONED CONTENT PREPARATION AND DELIVERY, which is herein incorporated by reference in its entirety.

Systems, methods, and devices of the invention are also described in U.S. Patent Publication 2012/0089669, application Ser. No. 13/269,269, filed Oct. 7, 2011, under and also claiming priority to U.S. Provisional 61/391,272, filed Oct. 8, 2010, by the same inventors and titled DISTRIBUTION OF CONTENT AND BEHAVIOR TO DISPARATE PLATFORMS, which is herein incorporated by reference in its entirety.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A method of interacting with a plurality of mobile devices, the method comprising using a server comprising a memory coupled to a processor for:
    receiving input from each of the plurality of devices;
    aggregating the input to create an aggregate result;
    sending the aggregate result to each of the plurality of devices;
    instructing each of the plurality of devices to calculate a delay time based on a server timepacket and to display the aggregate result after the delay time elapses; and
    receiving a timepacket from each of the plurality of devices and replying with the server timepacket, thereby causing the plurality of devices to all display the aggregate result within seconds of each other.

2. The method of claim 1 further comprising, prior to receiving the input:
sending an input prompt to each of the plurality of devices, thereby causing an appearance of the input prompt on each of the plurality of devices.

3. The method of claim 2 wherein the input prompt is a survey question.

4. The method of claim 2 further comprising causing each appearance of the input prompt on each of the plurality of devices to occur within one second of all of the other appearances of the input prompt.

5. The method of claim 1 further comprising synchronizing the receipt of input and the display of the aggregate result with a real-world event.

6. The method of claim 5 wherein the real-world event comprises a television broadcast.

7. The method of claim 1 wherein instructing each of the plurality of devices to calculate the delay time is done prior to replying with the server timepacket.

8. The method of claim 1 wherein replying with the server timepacket is done prior to instructing each of the plurality of devices to calculate the delay time.

9. The method of claim 1 wherein the aggregate result comprises a pollgraph.

10. The method of claim 1 wherein the aggregate result comprises voting results.

11. The method of claim 1 further comprising sending instructions to each of the plurality of devices to calculate a delay time by using the server timepacket to determine a round-trip time and adding half of the round-trip time to a server time.

12. The method of claim 1 further comprising:
sending a desired event time DET to each of the plurality of devices;
instructing each device to calculate a roundtrip time based on a time t1 at which the device sent the timepacket and a time t3 at which the device received the server timepacket; and
use a time t4 at which the device receives the aggregate result and a time t2 at which the server sent the server timepacket to calculate the delay as:

delay=DET−$t4$+$t2$+($t3$−$t1$)/2−$t3$.

13. A method of conducting a quiz, the method comprising using a server comprising a memory coupled to a processor for:
sending a question to a plurality of mobile devices;
instructing each of the plurality of devices to calculate a delay time based on a server timepacket;
instructing each of the plurality of devices to, after the delay time elapses, display the question, prompt for input, and receive an answer;
receiving a timepacket from each of the plurality of devices and replying with the server timepacket, thereby causing the plurality of devices to all display the question within seconds of each other;
receiving an answer from each of the plurality of devices; and
determining an identity of a person using one of the plurality of devices and who answered correctly.

14. The method of claim 13 further comprising:
sending the identity of the person to each of the plurality of devices; and
instructing each device to display the identity of the person after the delay time lapses.

15. The method of claim 14 wherein the question relates to a television broadcast.

16. The method of claim 13 further comprising receiving the timepacket from each of the plurality of devices and replying with the server timepacket a plurality of times for each of the plurality of devices.

17. The method of claim 13 further comprising instructing each of the plurality of devices to display the question within one second of one another.

18. The method of claim 13 further comprising synchronizing the display of the question and the display of the identity with a real-world event.

19. The method of claim 13 further comprising instructing each of the plurality of devices to calculate the delay time by using the server timepacket to determine a round-trip time and adding half of the round-trip time to a server time.

20. The method of claim 13 further comprising:
sending a desired event time DET to each of the plurality of devices;
instructing each device to calculate a roundtrip time based on a time t1 at which the device sent the timepacket and a time t3 at which the device received the server timepacket; and
use a time t4 at which the device receives the question and a time t2 at which the server sent the server timepacket to calculate the delay as:

delay=DET−$t4$+$t2$+($t3$−$t1$)/2−$t3$.

* * * * *